(12) United States Patent
Ga et al.

(10) Patent No.: US 10,864,785 B2
(45) Date of Patent: Dec. 15, 2020

(54) APPARATUS AND METHOD FOR MONITORING TIRE PRESSURE

(71) Applicants: HYUNDAI MOTOR COMPANY, Seoul (KR); KIA MOTORS CORPORATION, Seoul (KR)

(72) Inventors: Han Seon Ga, Gwangmyeong-si (KR); Myung Ki Yeom, Incheon (KR); Ju Yong Kang, Hanam-si (KR); Hyun Dong Her, Seoul (KR); Wang Gi Hong, Suwon-si (KR); Joon Sang Jo, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 44 days.

(21) Appl. No.: 16/458,758

(22) Filed: Jul. 1, 2019

(65) Prior Publication Data
US 2020/0171892 A1 Jun. 4, 2020

(30) Foreign Application Priority Data
Dec. 4, 2018 (KR) .................. 10-2018-0154728

(51) Int. Cl.
*B60C 23/06* (2006.01)
*B60C 23/02* (2006.01)
(52) U.S. Cl.
CPC .............. *B60C 23/06* (2013.01); *B60C 23/02* (2013.01)

(58) Field of Classification Search
CPC ..... B60C 23/061; B60C 23/02; B60C 23/062; B60C 23/06
See application file for complete search history.

(56) References Cited

U.S. PATENT DOCUMENTS

| 6,323,765 | B1 | 11/2001 | Horie et al. |
| 8,970,361 | B2 | 3/2015 | Sakagami et al. |
| 2008/0178667 | A1* | 7/2008 | Kusunoki ........... B60C 23/0408 73/146.4 |
| 2012/0105222 | A1* | 5/2012 | Miller .................... G07C 5/085 340/441 |
| 2013/0321138 | A1 | 12/2013 | Sakagami et al. |
| 2014/0039752 | A1* | 2/2014 | Juzswik ................. B60C 23/02 701/34.4 |

FOREIGN PATENT DOCUMENTS

| DE | 10 2012 206 845 A1 | 10/2013 |
| JP | 2014-223863 A | 12/2014 |

* cited by examiner

*Primary Examiner* — Omeed Alizada
(74) *Attorney, Agent, or Firm* — Morgan, Lewis & Bockius LLP

(57) ABSTRACT

An apparatus for monitoring a tire pressure includes a controller configured to determine whether vehicle state information and tire information satisfy a reference condition when a reset button of a tire pressure is operated, detect the tire pressure when the vehicle state information and the tire information satisfy the reference condition, and reset the tire pressure when the tire pressure is within a reference pressure range.

19 Claims, 9 Drawing Sheets

# APPARATUS AND METHOD FOR MONITORING TIRE PRESSURE

CROSS-REFERENCE TO RELATED APPLICATION

This application claims the benefit of priority to Korean Patent Application No. 10-2018-0154728, filed in the Korean Intellectual Property Office on Dec. 4, 2018, the entire contents of which are incorporated herein by reference.

TECHNICAL FIELD

The present disclosure relates to an apparatus and a method for monitoring a tire pressure.

BACKGROUND

A method for measuring a tire pressure of a motor vehicle can be classified into a direct type and an indirect type. In the case of the indirect method, four wheel speed sensors are respectively placed on wheels, a dynamic radius and a frequency are analyzed based on the wheel speed, and the tire pressure is measured based on the analysis result.

A tire pressure monitoring system (TPMS) determines the tire pressure and performs a warning control with respect to the tire pressure using the determined tire pressure as a reference value.

In this case, when a user operates a tire pressure setting button, the tire pressure monitoring system determines the tire pressure and stores the tire pressure as the reference value.

However, when the user arbitrarily operates the tire pressure setting button in a state where the tire pressure is in a low range, the tire pressure monitoring system determines the tire pressure of the low pressure state and sets the reference value for the low tire pressure wanting to be lower than a minimum required value. In this case, the tire pressure monitoring system does not warn even when the tire pressure is in the low range, and as a result, a dangerous situation occurs.

SUMMARY

The present disclosure has been made to solve the above-mentioned problems occurring in the prior art while advantages achieved by the prior art are maintained intact.

An aspect of the present disclosure provides an apparatus and a method for monitoring a tire pressure, which are capable of improving a stability and a reliability by allowing a tire pressure to be finally stored through various reset processes when operating a reset button for the tire pressure and by preventing an incorrect tire pressure from being stored when the reset button for the tire pressure is incorrectly operated.

The technical problems to be solved by the present disclosure are not limited to the aforementioned problems, and any other technical problems not mentioned herein will be clearly understood from the following description by those skilled in the art to which the present disclosure pertains.

According to an exemplary embodiment of the present disclosure, a tire pressure monitoring apparatus may include a controller configured to: determine whether vehicle state information and tire information satisfy a reference condition when a reset button of a tire pressure is operated, detect the tire pressure when the vehicle state information and the tire information satisfy the reference condition, and reset the tire pressure when the tire pressure is within a reference pressure range.

The controller determines state information about a brake pedal and a gear stage of a vehicle and determines that the vehicle state information satisfies a first reference condition when the brake pedal is pressed and the gear stage is engaged at a parking (P) stage.

The controller requests a user to input the tire information when the reset button of the tire pressure is operated.

The tire information includes information about a manufacturer of the tire and information about a size of a tire.

The controller determines a reference pressure of a corresponding tire based on the tire information input by the user.

The controller outputs a message that notifies information about the determined reference pressure of the tire.

The controller determines that the tire information satisfies a second reference condition when the tire information input by the user satisfies a reference specification.

The controller outputs a message that notifies a performance degradation and a service center visit when the tire information input by the user does not satisfy the second reference condition.

The controller outputs a message that notifies a reset completion state of the tire pressure.

The controller outputs an alarm when the tire pressure exceeds the reference pressure range.

The controller detects the tire pressure based on a resonance frequency and a dynamic radius of the tire.

According to another exemplary embodiment of the present disclosure, a tire pressure monitoring method may include steps of: determining whether vehicle state information and tire information input by a user satisfy a reference condition when a reset button of a tire pressure is operated; detecting the tire pressure when the reference condition is satisfied; resetting the tire pressure when the tire pressure is within a reference pressure range; and outputting an alarm when the tire pressure is not within the reference pressure range.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
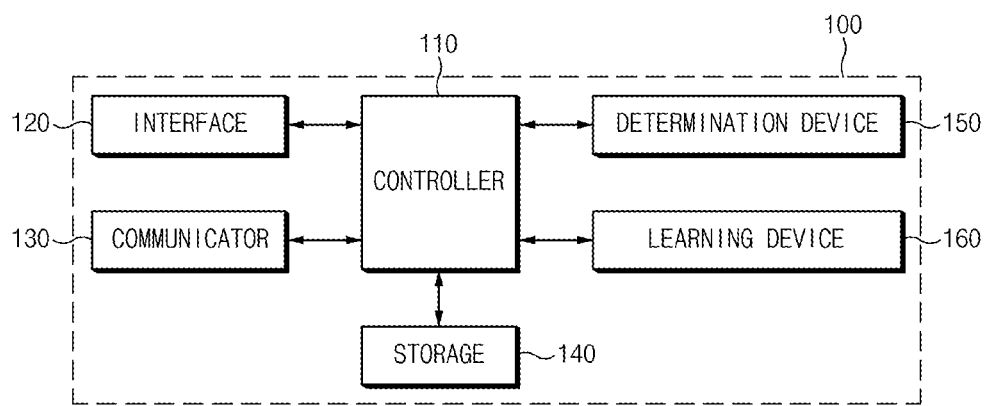
FIG. 1 is a view illustrating a configuration of a tire pressure monitoring apparatus according to an exemplary embodiment of the present disclosure.

Exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of a tire pressure monitoring apparatus according to an exemplary embodiment of the present disclosure.

The tire pressure monitoring apparatus 100 may be implemented inside a vehicle. In this case, the tire pressure monitoring apparatus 100 may be integrally formed with internal control devices of the vehicle or may be connected to the control devices of the vehicle by a separate connector after being implemented as a separate device. As an example, the tire pressure monitoring apparatus 100 may be implemented as a tire pressure monitoring system (TPMS).

Referring to FIG. 1, the tire pressure monitoring apparatus 100 may include a controller 110, an interface 120, a communicator 130, a storage 140, a determination device 150, and a learning device 160. In the present exemplary embodiment, the controller 110, the determination device 150, and the learning device 160 of the tire pressure monitoring apparatus 100 may be implemented as at least one processor. Alternatively, the controller 110 may be an electronic control unit (ECU) having the determination device 150 and the learning device 160 embedded therein.

The controller 110 may process signals transmitted to each component of the tire pressure monitoring apparatus 100.

The interface 120 may include an input device to receive a control instruction from a user and an output device to output an operation state and operation results of the tire pressure monitoring apparatus 100.

Here, the input device may include a key button, a mouse, a joystick, a jog shuttle, a stylus pen, and the like. In addition, the input device may include a soft key implemented on a display.

The output device may include the display for displaying a tire pressure state and/or a message according to the tire pressure state. In a case that a touch sensor, e.g., a touch film, a touch sheet, or a touch pad, is included in the display, the display may operate as a touch screen, and the display may be implemented in an integrated form of the input device and the output device.

The display may include at least one of a liquid crystal display (LCD), a thin film transistor-liquid crystal display (TFT-LCD), an organic light-emitting diode (OLED), a flexible display, a field emission display (FED), or a three-dimensional (3D) display.

In addition, the output device may further include an instrument panel for lighting a warning light according to the tire pressure state. Further, the output device may further include a speaker or a buzzer that outputs a warning sound according to the tire pressure state.

The communicator 130 may include a communication module that supports a communication interface with electrical equipment and/or control devices included in the vehicle. For example, the communicator 130 may include the communication module that supports signal transmission and reception between sensors and/or control devices included in the vehicle. In the exemplary embodiments, the communication module may be a module supporting a vehicle network communication, such as a controller area network (CAN) communication, a local interconnect network (LIN) communication, and a Flex-ray communication.

In addition, the communicator 130 may further include a module for a wireless internet access and/or a communication module for a short range communication.

The storage 140 may store data and/or algorithms required to operate the tire pressure monitoring apparatus 100.

As an example, the storage 140 may store vehicle state information and tire information. In addition, the storage 140 may store condition information, instructions, and/or algorithms, which are required to carry out a reset process of the tire pressure.

In the exemplary embodiments, the storage 140 may include a storage medium, such as a random access memory (RAM), a static random access memory (SRAM), a read-only memory (ROM), a programmable read-only memory (PROM), or an electrically erasable programmable read-only memory (EEPROM).

The determination device 150 determines whether the reset button for the tire pressure is operated. In this case, when the reset button for the tire pressure is operated, the determination device 150 determines whether the vehicle state information and the tire information satisfy a reference condition.

The vehicle state information may include state information about a brake and a gear stage of the vehicle. The vehicle state information may be provided from a sensor and/or a management system connected to the communicator 130. In addition, the tire information may include tire manufacturer information and tire size information. The tire information may be input by the user.

The determination device 150 may determine the state information about the brake and the gear stage of the vehicle and may determine that a first reference condition is satisfied when it is determined that a brake pedal is pressed and a gear stage is engaged at a P stage.

In addition, the determination device 150 may determine that a second reference condition is satisfied when it is determined that the tire information input by the user corresponds to a reference specification.

The learning device 160 receives information on the tire pressure when it is determined that the first reference condition and the second reference condition are satisfied by the determination device 150. In this case, the learning device 160 may receive the tire pressure information based on a resonance frequency and a dynamic radius of the tire.

The controller 110 may display a message to guide an operation of the brake pedal and a gear shift lever on the display when it is determined that the vehicle state information does not satisfy the first reference condition by the determination device 150 when operating the reset button for the tire pressure.

The controller 110 may request the user to input the tire information when it is determined that the vehicle state information satisfies the first reference condition. For example, the controller 110 may form a tire information input screen and may display the tire information input screen on the display.

When the tire information is input by the user, the controller 110 may determine a reference pressure of a corresponding tire based on the tire information input by the user. The determined reference pressure information may be stored in the storage 140.

In addition, when the reference pressure of the tire is determined based on the tire information input by the user, the controller 110 may display a message to notify information about the determined reference pressure of the tire on the display.

When the tire pressure is received by the learning device 160, the controller 110 determines whether the learned tire pressure is in a range of the reference pressure. When the learned tire pressure is in the range of the reference pressure, the controller 110 resets the tire pressure based on the learned tire pressure and stores the reset tire pressure.

When the reset of the tire pressure is completed, the controller 110 may display a message to notify the reset completion state of the tire pressure on the display.

When the learned tire pressure exceeds the reference pressure range, the controller 110 may output an alarm to notify an abnormal state of the tire. For example, the controller 110 may output a low tire pressure alarm when the learned tire pressure is below a minimum value of the reference pressure range of the tire. In addition, the controller 110 may output an over inflation alarm when the learned tire pressure exceeds a maximum value of the reference pressure range of the tire.

The control unit 110 may display a message to notify a performance degradation and a service center visit on the display when it is determined that the tire information input by the user does not satisfy the second reference condition.

Hereinafter, an operation of the tire pressure monitoring apparatus, which has the above-mentioned configurations, according to the present disclosure will be described in detail.

Figure 2:
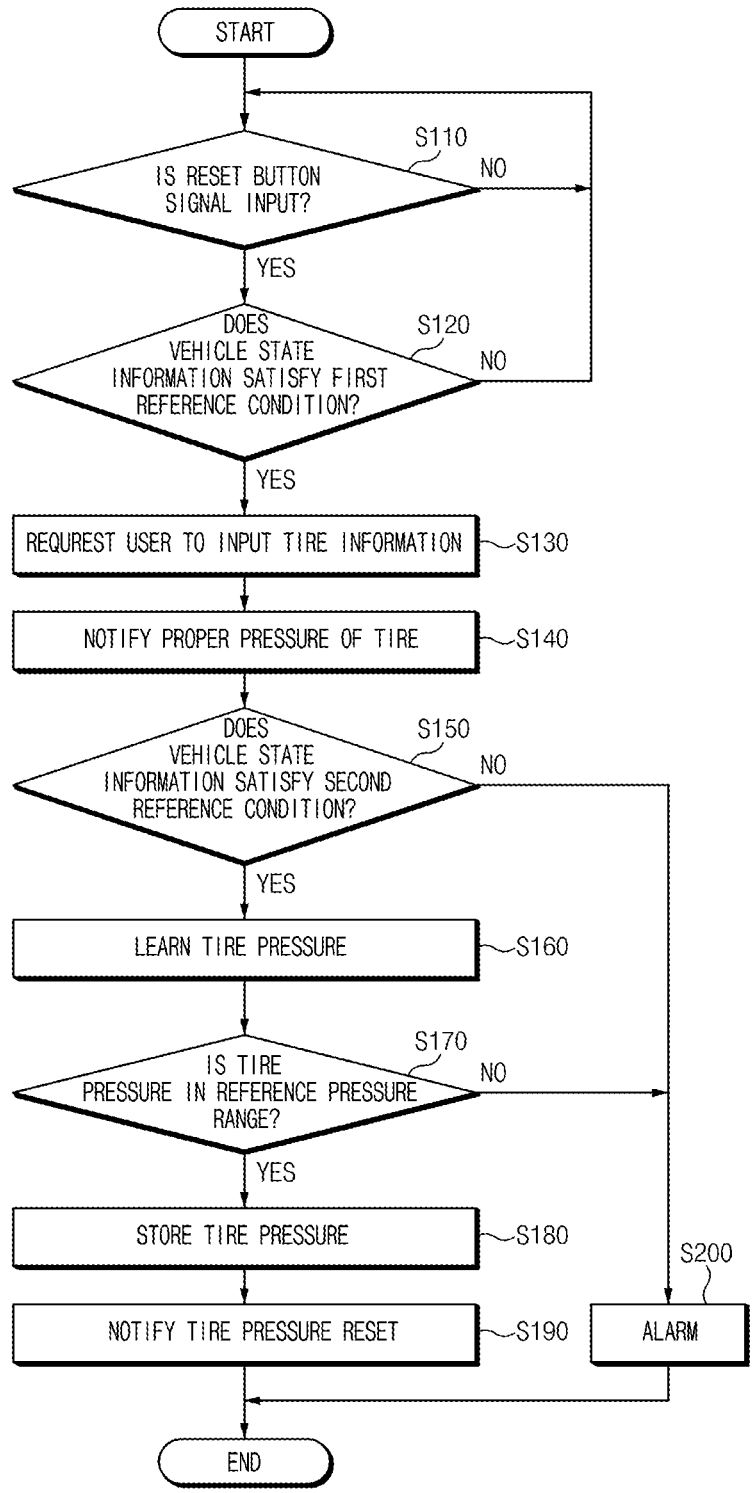
FIG. 2 is a flowchart illustrating an operation of a tire pressure monitoring method according to an exemplary embodiment of the present disclosure.

FIG. 2 is a flowchart illustrating an operation of the tire pressure monitoring method according to an exemplary embodiment of the present disclosure.

Referring to FIG. 2, when a reset button signal corresponding to the operation of the reset button for tire pressure is input (S110), the tire pressure monitoring apparatus 100 identifies the vehicle state information. In this case, the tire pressure monitoring apparatus 100 identifies the state information about the brake and the gear stage of the vehicle (S120). When it is identified that the brake pedal is not pressed or the gear stage is not engaged at the P stage in operation S120, the tire pressure monitoring apparatus 100 determines that the first reference condition is not satisfied and re-executes operation S110.

Although not shown in FIG. 2, when it is determined that the first reference condition is not satisfied in operation S120, the tire pressure monitoring apparatus 100 may display the message to guide the operation of the brake pedal and the gear shift lever on the display. This will be described in detail with reference to FIG. 3.

Figure 3:
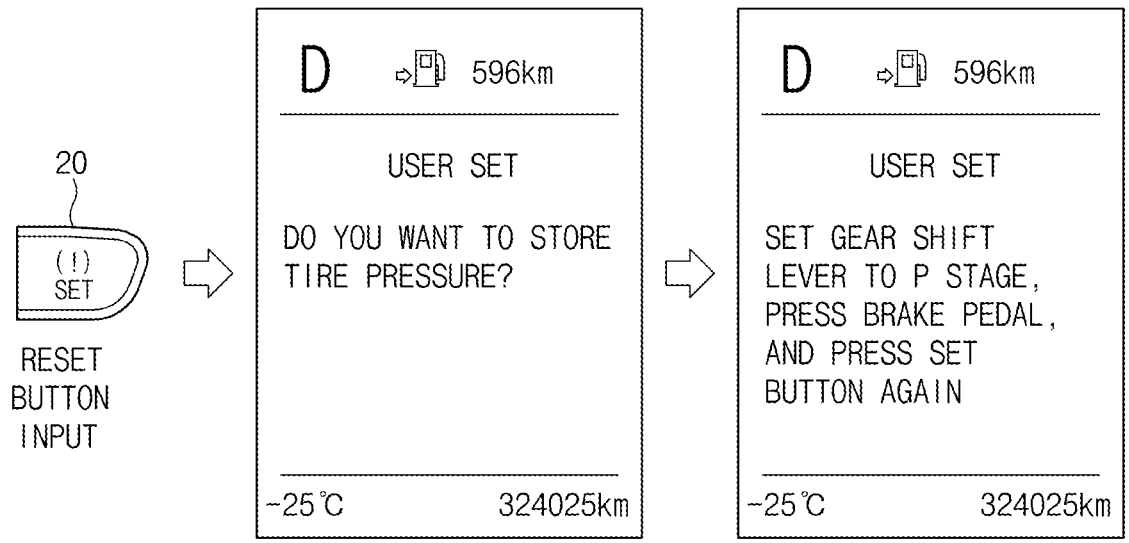
FIGS. 3-6, 7A, and 7B are views illustrating exemplary embodiments for explaining an operation of a tire pressure monitoring apparatus according to an exemplary embodiment of the present disclosure.

Referring to FIG. 3, when the reset button 20 is operated, the tire pressure monitoring apparatus 100 outputs the message for identifying whether to store the tire pressure, and when a response, which allows the tire pressure to be stored, is received from the user, the tire pressure monitoring apparatus 100 identifies the state of the brake pedal and the gear shift lever. When it is identified that the brake pedal is not pressed and/or the gear stage is not engaged at the P stage, the tire pressure monitoring apparatus 100 may output the message to guide the operation of the brake pedal and/or the gear shift lever.

When it is determined that the vehicle state information satisfies the first reference condition in operation S120, the tire pressure monitoring apparatus 100 may request the user to input the tire information (S130). As an example, the tire pressure monitoring apparatus 100 may form the tire information input screen and may display the tire information input screen on the display. This will be described with reference to FIG. 4.

Figure 4:
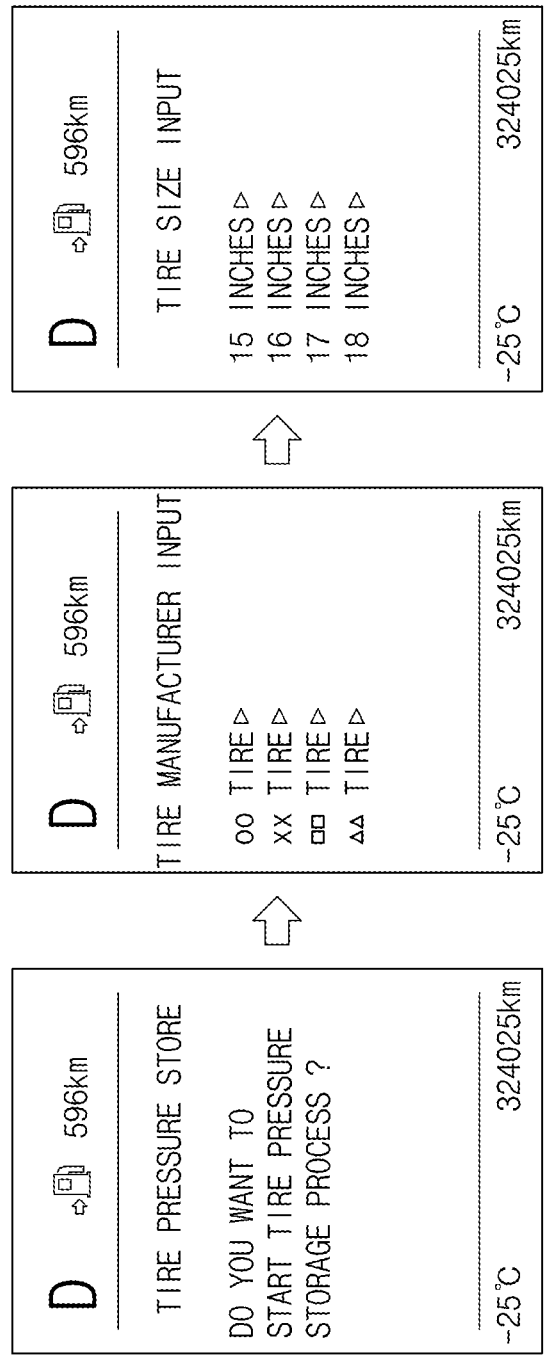

Referring to FIG. 4, when it is determined that the vehicle state information satisfies the first reference condition, the tire pressure monitoring apparatus 100 may inquire the user whether to proceed with the storing process of the tire pressure. In this case, when a response, which allows the storing process of the tire pressure to proceed with, is received from the user, the tire pressure monitoring apparatus 100 displays a screen to select the tire manufacturer and the tire size on the display as shown in FIG. 4. The user may input the information about the tire manufacturer and the tire size by selecting any one of items displayed on the display.

When the tire information is input by the user, the tire pressure monitoring apparatus 100 may determine the reference pressure of the corresponding tire based on the tire information input by the user and may notify the determined reference pressure to the user (S140). This will be described in detail with reference to FIG. 5.

Figure 5:
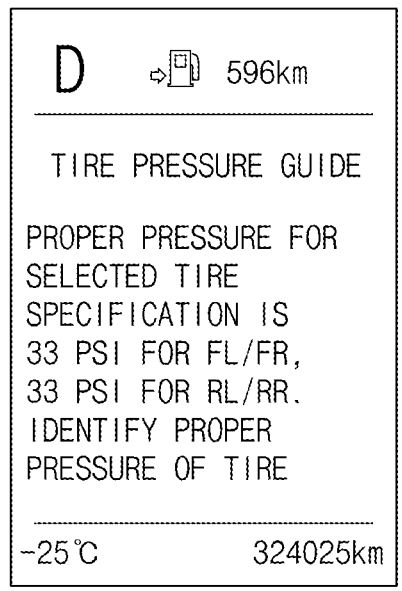

As shown in FIG. 5, the tire pressure monitoring apparatus 100 may display a message on the display to notify the reference pressure determined corresponding to a tire specification input by the user as a proper pressure.

The tire pressure monitoring apparatus 100 determines whether the tire information input by the user corresponds to the reference specification of the corresponding vehicle. In this case, when it is identified that the tire information corresponds to the reference specification, the tire pressure monitoring apparatus 100 determines that the second reference condition is satisfied (S150) and receives information on the tire pressure (S160). In operation S160, the tire pressure monitoring apparatus 100 may determine the tire pressure based on the resonance frequency and the dynamic radius of the tire.

When the learning of the tire pressure is completed, the tire pressure monitoring apparatus 100 identifies whether the tire pressure learned in operation S160 is within the reference pressure range (S170).

When the learned tire pressure is within the reference pressure range, the tire pressure monitoring apparatus 100 resets the tire pressure based on the learned tire pressure and stores the reset tire pressure (S180).

Here, the reference pressure of the tire may vary depending on the manufacturer of the tire. This will be described in detail with reference to FIG. 6.

Figure 6:
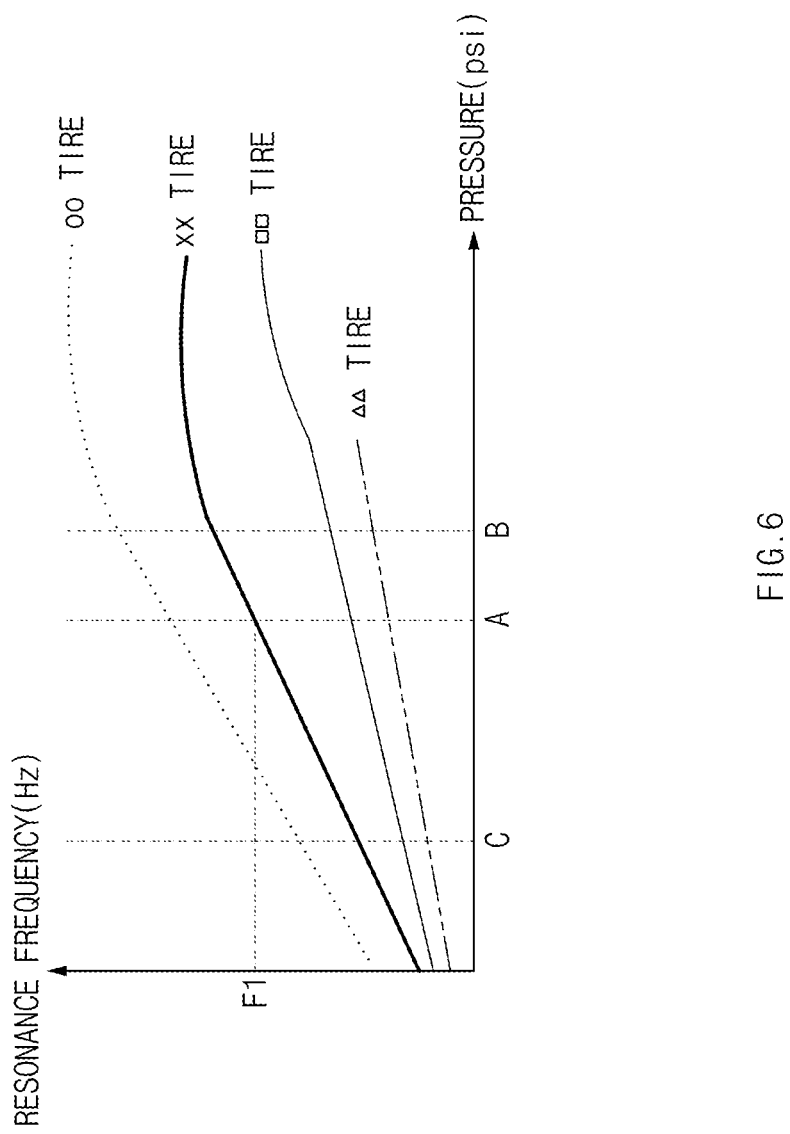

Referring to FIG. 6, when the manufacturer of the tire provided in the vehicle is an xx tire, the reference pressure of the xx tire may be determined as "A" at which the resonance frequency is "F1". In this case, the tire pressure monitoring apparatus 100 may reset the tire pressure and may store the reset tire pressure when the learned tire pressure corresponds to between a minimum value "C" and a maximum value "B". When the tire pressure is less than "C" or exceeds "B", the tire pressure monitoring apparatus 100 does not reset the tire pressure.

Figure 7A:
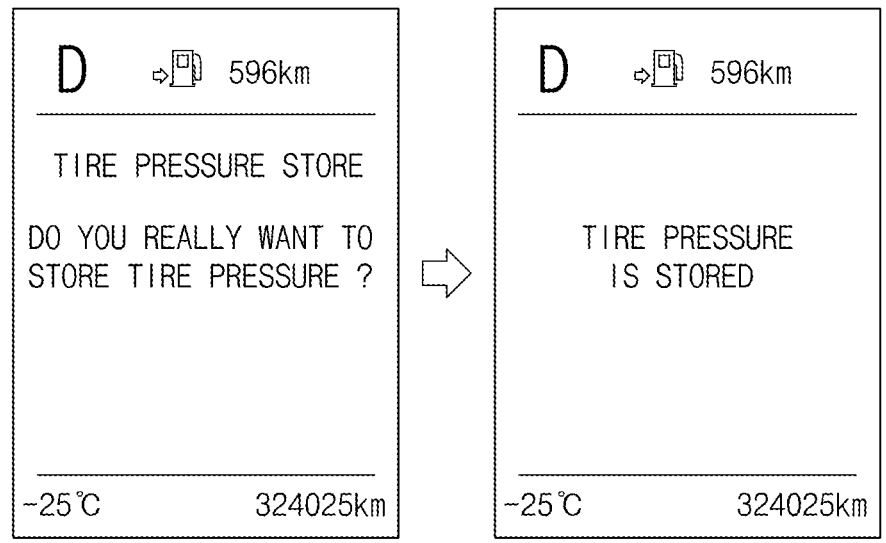

When the reset of the tire pressure is completed, the tire pressure monitoring apparatus 100 may display the message on the display to notify the reset completion state of the tire pressure (S190). This will be described in detail with reference to FIG. 7A.

When it is determined that the tire information does not satisfy the second reference condition in operation S150, the tire pressure monitoring apparatus 100 may output the alarm (S200).

In addition, when the tire pressure learned in operation S160 exceeds the reference pressure range, the tire pressure monitoring apparatus 100 may output the alarm to notify the abnormal state of the tire (S200). As an example, the tire pressure monitoring apparatus 100 may output the low tire pressure alarm when the learned tire pressure is less than a minimum value of the reference pressure of the tire, and may output the over inflation alarm when the learned tire pressure exceeds a maximum value of the reference pressure of the tire.

Figure 7B:
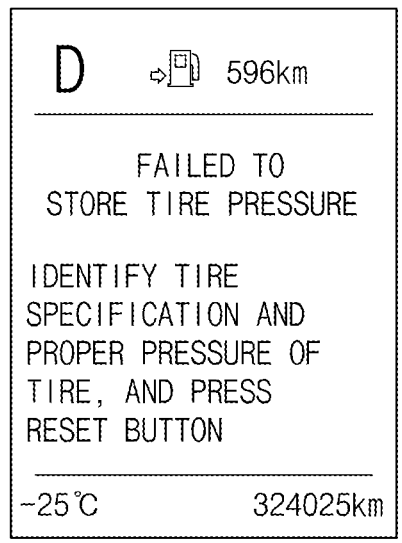

The embodiment that outputs the alarm refers to FIG. 7B.

As described above, when the reset button 20 for the tire pressure is operated by the user (or a driver), the tire pressure monitoring apparatus 100 according to the present disclosure may prevent an incorrect tire pressure from being stored caused due to simple incorrect operation by executing the reset operation for the tire pressure through various reset processes.

The tire pressure monitoring apparatus 100, which operates as described above, may be implemented in one independent hardware including a memory and a processor processing to each operation and may be driven while being included in other hardware, e.g., a microprocessor or a general-purpose computer system.

Figure 8:
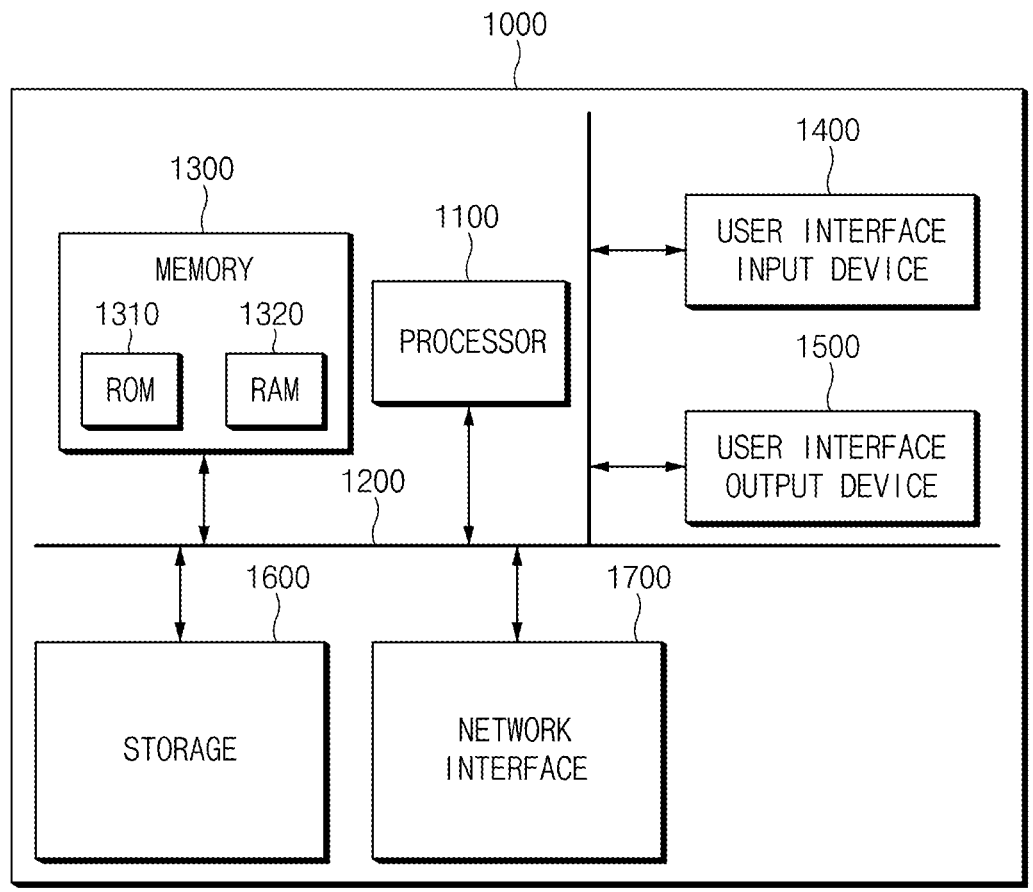
FIG. 8 is a block diagram illustrating a configuration of a computing system that executes a method according to an exemplary embodiment of the present disclosure.

FIG. 8 is a block diagram illustrating a configuration of a computing system that executes a method according to an exemplary embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal.

In another case, the processor 1100 and the storage medium may reside in the user terminal as separate components.

According to the present disclosure, the apparatus and the method for monitoring the tire pressure may prevent an incorrect tire pressure from being stored caused due to the incorrect operation of the reset button for the tire pressure by allowing the tire pressure to be finally stored through various reset processes when operating the reset button for the tire pressure and may improve a stability and a reliability.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplar)/embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A tire pressure monitoring apparatus comprising a controller configured to:
    determine whether vehicle state information and tire information satisfy a reference condition when a reset button of a tire pressure is operated,
    detect the tire pressure when the vehicle state information and the tire information satisfy the reference condition,
    reset the tire pressure when the tire pressure is within a reference pressure range; and
    wherein the controller is configured to: determine state information on a brake pedal and a gear stage of a vehicle; and
    determine that the vehicle state information satisfies a first reference condition when the brake pedal is pressed and the gear stage is engaged at a parking (P) stage.

2. The tire pressure monitoring apparatus of claim 1, wherein the controller is further configured to request a user to input the tire information when the reset button of the tire pressure is operated.

3. The tire pressure monitoring apparatus of claim 2, wherein the tire information comprises information on a manufacturer and a size of a tire.

4. The tire pressure monitoring apparatus of claim 2, wherein the controller is further configured to determine a reference pressure of a corresponding tire based on the tire information input by the user.

5. The tire pressure monitoring apparatus of claim 4, wherein the controller is further configured to output a message that notifies the reference pressure of the corresponding tire.

6. The tire pressure monitoring apparatus of claim 2, wherein the controller is configured to determine that the tire information satisfies a second reference condition when the tire information input by the user satisfies a reference specification.

7. The tire pressure monitoring apparatus of claim 6, wherein the controller is further configured to output a message that notifies a performance degradation and a service center visit when the tire information input by the user does not satisfy the second reference condition.

8. The tire pressure monitoring apparatus of claim 1, wherein the controller is further configured to output a message that notifies a reset completion state of the tire pressure.

9. The tire pressure monitoring apparatus of claim 1, wherein the controller is further configured to output an alarm when the tire pressure exceeds the reference pressure range.

10. The tire pressure monitoring apparatus of claim 1, wherein the controller is configured to determine the tire pressure based on a resonance frequency and a dynamic radius of a tire.

11. A the pressure monitoring method comprising steps of:
    determining whether vehicle state information and tire information input by a user satisfy a reference condition when a reset button of a tire pressure is operated;
    detecting the tire pressure when the reference condition is satisfied;
    resetting the tire pressure when the tire pressure is within a reference pressure range;
    outputting an alarm when the tire pressure is not within the reference pressure range; and
    wherein the step of determining whether vehicle state information and tire information input by a user satisfy a reference condition comprises:
    determining state information about a brake pedal and a gear stage of a vehicle; and determining that the vehicle state information satisfies a first reference condition when the brake pedal is pressed and the gear stage is engaged at a parking (P) stage.

12. The tire pressure monitoring method of claim 11, further comprising a step of requesting the user to input the tire information when the reset button of the tire pressure is operated.

13. The tire pressure monitoring method of claim 12, wherein the tire information comprises information on a manufacturer and a size of a tire.

14. The tire pressure monitoring method of claim 12, further comprising steps of:
    determining a reference pressure of a corresponding tire based on the tire information input by the user; and
    outputting a message to notify the reference pressure of the corresponding tire.

15. The tire pressure monitoring method of claim 12, wherein the step of determining comprises determining that the tire information satisfies a second reference condition when the tire information input by the user satisfies a reference specification.

16. The tire pressure monitoring method of claim 15, further comprising a step of outputting a message to notify a performance degradation and a service center visit when the tire information input by the user does not satisfy the second reference condition.

17. The tire pressure monitoring method of claim 11, further comprising a step of outputting a message to notify a reset completion state of the tire pressure.

18. The tire pressure monitoring method of claim 11, further comprising a step of outputting an alarm when the tire pressure exceeds the reference pressure range.

19. The tire pressure monitoring method of claim 11, wherein the step of detecting comprises determining the tire pressure based on a resonance frequency and a dynamic radius of a tire.

\* \* \* \* \*